UNITED STATES PATENT OFFICE.

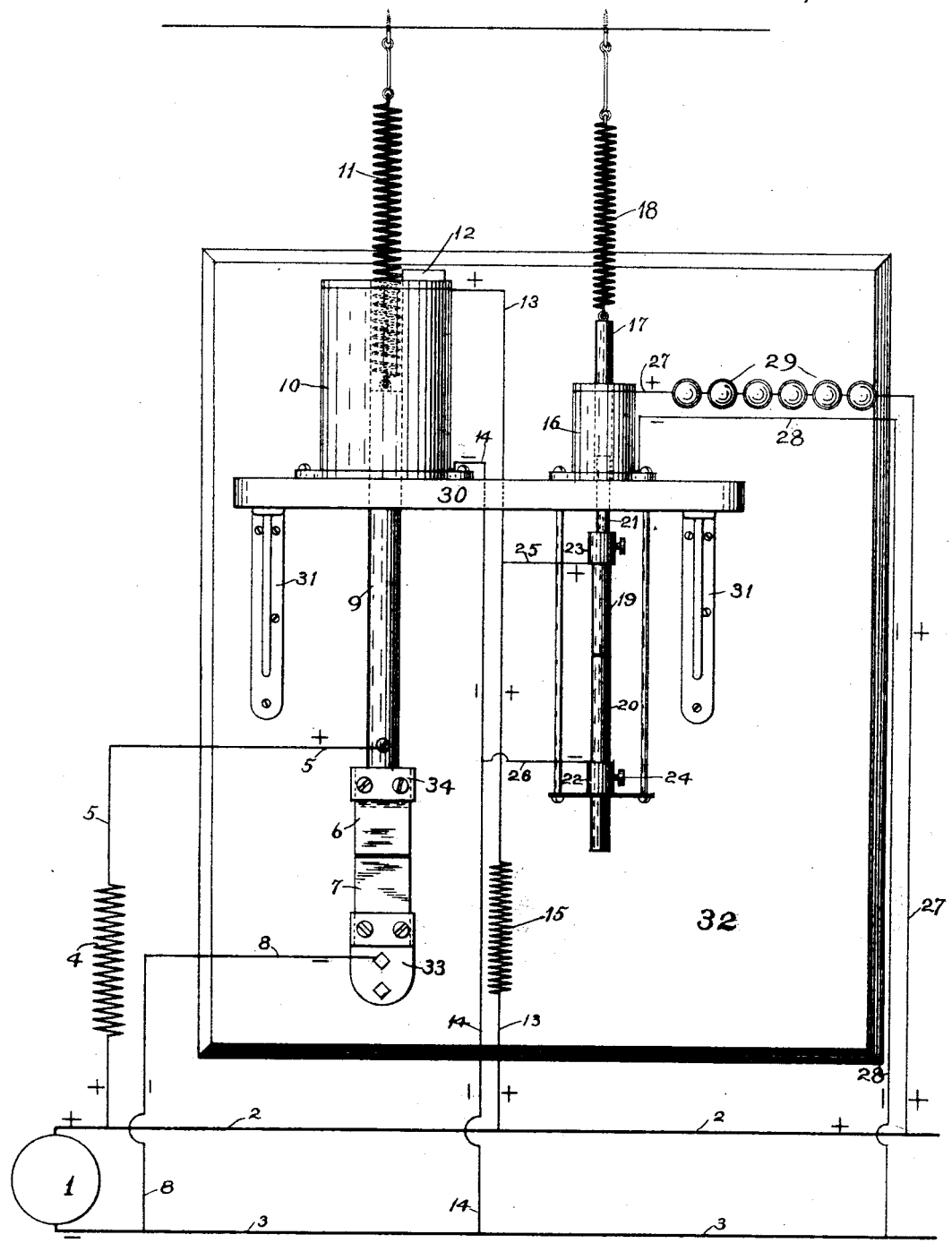

EDWARD A. BARBER, OF WATERTOWN, NEW YORK.

ELECTRIC REGULATING SWITCH.

SPECIFICATION forming part of Letters Patent No. 511,187, dated December 19, 1893.

Application filed June 26, 1893. Serial No. 478,903. (No model.)

*To all whom it may concern:*

Be it known that I, EDWARD A. BARBER, a citizen of the United States, and a resident of Watertown, county of Jefferson, State of New York, have invented certain new and useful Improvements in Electric Regulating Switches, of which the following is a specification.

An electric generator run by a uniform power develops a uniform amount of electrical energy. In the operation of street cars the amount of electrical energy required varies greatly. It is therefore necessary to either vary the power which actuates the generator or maintain a practically uniform load.

The object of my invention is to maintain the power supply at its maximum and automatically to transfer the electrical energy not needed for operating motors on the main line to suitable resistance coils for absorbing the surplus energy.

The drawing shows the apparatus attached to a switch board.

1, represents an electric generator.

2 is the trolley wire 3, ground wire, 4 regulating resistance coil, 5 wire leading to regulating switch, 6 upper half of regulating switch, 7 lower half of regulating switch, 8 wire leading back to ground wire, 9 iron core, 10 solenoid which operates switch 6 and 7.

11 is a coiled spring which partly lifts iron core 9.

12 is a piece of soft iron which aids spring 11 to hold up iron core 9 when an electric current is passing through solenoid 10; it also acts as a brake to catch the iron core and prevent further reciprocation.

13 is a wire leading from trolley wire 2 to solenoid 10, 14 wire leading back from solenoid 10 to ground wire 3, 15 resistance coil to keep too much current from flowing through solenoid 10, 16 governing solenoid which controls solenoid 10, 17 iron core of solenoid 16; 18 coil spring which supports iron core 17 above the center of attraction of solenoid 16.

19 is a carbon rod attached to the iron core 17 by a brass rod 21.

20 is the lower carbon rod.

22 is lower carbon holder; 23 upper carbon holder that holds carbon 19; 24 binding screw to adjust carbon rod 20.

25 and 26 are wires that short circuit solenoid 10 when the carbon rod 19 comes in contact with carbon rod 20; 27 wire leading from trolley wire 2 to solenoid 16; 28 wire leading back from solenoid 16 to ground wire 3; 29 lamp resistance to keep too much current from flowing through solenoid 16; 30 shelf; 31 shelf brackets.

32 represents a switch board to which the apparatus is attached.

33 is a clamp attaching contact piece 7 to the switch board.

34 is a clamp attaching contact piece 6 with iron core 9.

For the purpose of absorbing the electrical energy which I may desire to transfer from the main circuit when a portion of the car motors is cut out, I use a coil of iron wire of large resistance, but any kind of electrical resistance might be used in its place. This resistance coil is placed in parallel with the main circuit of 2 and 3 by the contact of terminals 6 and 7.

The operation is as follows: The solenoid 16, being in parallel with the main circuit, the voltage through the solenoid varies with the voltage of the main circuit, causing the iron core 17 to oscillate in a vertical direction with a length of stroke varying with the intensity of the current. When the voltage is high enough to overcome the full tension of the spring 18, the solenoid 16 draws the iron core down until contact is made between the terminals 19 and 20. The wires 13 and 14 which place the solenoid 10 in parallel with the main circuit 2 and 3, have branches 25 and 26 connected to the two terminals 19 and 20. When these terminals 19 and 20 are in contact it short circuits wires 13 and 14, whereupon the solenoid 10 becomes inoperative and the iron core 9 drops by gravity and makes a contact between terminals 6 and 7, thus introducing the regulating resistance coil 4 in parallel with the main circuit through 2 and 3. When a heavy load is brought upon main circuit 2 and 3, as by starting a loaded car, the voltage is reduced in the main circuit and consequently in the solenoid 16, which is in parallel with the main circuit. This reduces the magnetism of solenoid 16 and allows spring 18 to draw the iron core 17 and break the contact between 19 and 20. When the short circuit between wires 13 and 14 is broken by separating the terminals 19 and 20, the current through 13 and 14 will then pass through solenoid 10 and magnetize the iron core 9 and draws it upward. This separates the terminals 6 and 7 and breaks the circuit from the regulating resistance coil 4. The electric current is so great through terminals 6 and 7 when in contact, that I have found it important in order to avoid welding together of the terminals 6 and 7 to make one of them of a non-metallic substance, and have produced the most successful results by making one terminal of carbon and the other of copper. The use of the soft iron piece 12 to assist holding the iron core 9 when it is magnetized by solenoid 10, makes the operation more positive and prevents any oscillation of the contact point. The circuit through the terminals 19 and 20 when in contact, is not sufficient to overheat them, but with metallic terminals they become oxidized and fail to act in a short time. I have therefore found it important to use carbon for both terminals.

Having described my invention, what I claim as new, and desire to secure by Letters Patent, is—

1. In an electric power system wherein a generator is run by a uniform power and the surplus electrical energy not used by the driven motors is transferred to a regulating resistance coil, the combination with the main circuit and the regulating resistance coil of a switch operated directly by a solenoid, an auxiliary switch to short circuit said solenoid controlled by an auxiliary solenoid, which is connected in parallel to the main circuit and operated by variations in the voltage of the main circuit, substantially as set forth.

2. In an electric switch operated directly by a solenoid acting on an iron core, the combination with the solenoid and the iron core of a piece of soft iron located at one end of the solenoid to act as a brake to prevent oscillation of the switch, substantially as set forth.

In testimony that I claim the foregoing as my invention I have signed my name, in presence of two witnesses, this 15th day of June, 1893.

EDWARD A. BARBER.

Witnesses:
E. S. GOODALE,
GEO. W. ADAMS.